United States Patent [19]

Quirk

[11] Patent Number: 5,425,092
[45] Date of Patent: Jun. 13, 1995

[54] DELAYED CANCEL CALL WAITING

[75] Inventor: Carole F. Quirk, Kanata, Canada

[73] Assignee: Mitel Corporation, Kanata, Canada

[21] Appl. No.: 163,004

[22] Filed: Dec. 8, 1993

[30] Foreign Application Priority Data

Dec. 14, 1992 [CA] Canada ................................. 2085280

[51] Int. Cl.6 ............................................. H04M 3/42
[52] U.S. Cl. ..................................... 379/215; 379/201; 379/93; 379/97
[58] Field of Search ................... 379/201, 215, 93, 95, 379/97, 98

[56] References Cited

U.S. PATENT DOCUMENTS

| | | | |
|---|---|---|---|
| 4,596,021 | 6/1986 | Carter et al. | 379/98 |
| 4,661,975 | 4/1987 | Brecher | 379/215 |
| 4,852,151 | 7/1989 | Dittakavi et al. | 379/97 |
| 4,922,521 | 5/1990 | Krikke et al. | 379/95 |
| 4,995,074 | 2/1991 | Goldman et al. | 379/97 |

FOREIGN PATENT DOCUMENTS 3-157043  7/1991  Japan ..................... 379/215

*Primary Examiner*—James L. Dwyer
*Assistant Examiner*—Parag Dharia
*Attorney, Agent, or Firm*—Marks & Clerk

[57] ABSTRACT

A telecommunications system with a call waiting feature, comprises a central office and a plurality of subscribers. The system includes an arrangement for transmitting a signal over an off-hook line to alert the subscriber to the presence of an incoming call, and a cancel call waiting (CCW) register at the central office. The CCW register is associated with each subscriber line and is set to cancel the call waiting feature in response to receipt of a cancellation code over the associated subscriber line and is reset upon termination of a subsequent call. The central office further comprises a delayed cancel call waiting (DCCW) register for each subscriber line with at least a first state and a second state. The DCCW register is set to the first state in response to receipt of a DCCW access code transmitted over its associated subscriber line. An arrangement is provided for checking and resetting the state of said DCCW register when the associated line goes off hook in response to an incoming call. The CCW register is set in response to detection of a first state condition in the DCCW register so as to cancel the call waiting feature only for the duration of a single incoming call.

3 Claims, 1 Drawing Sheet

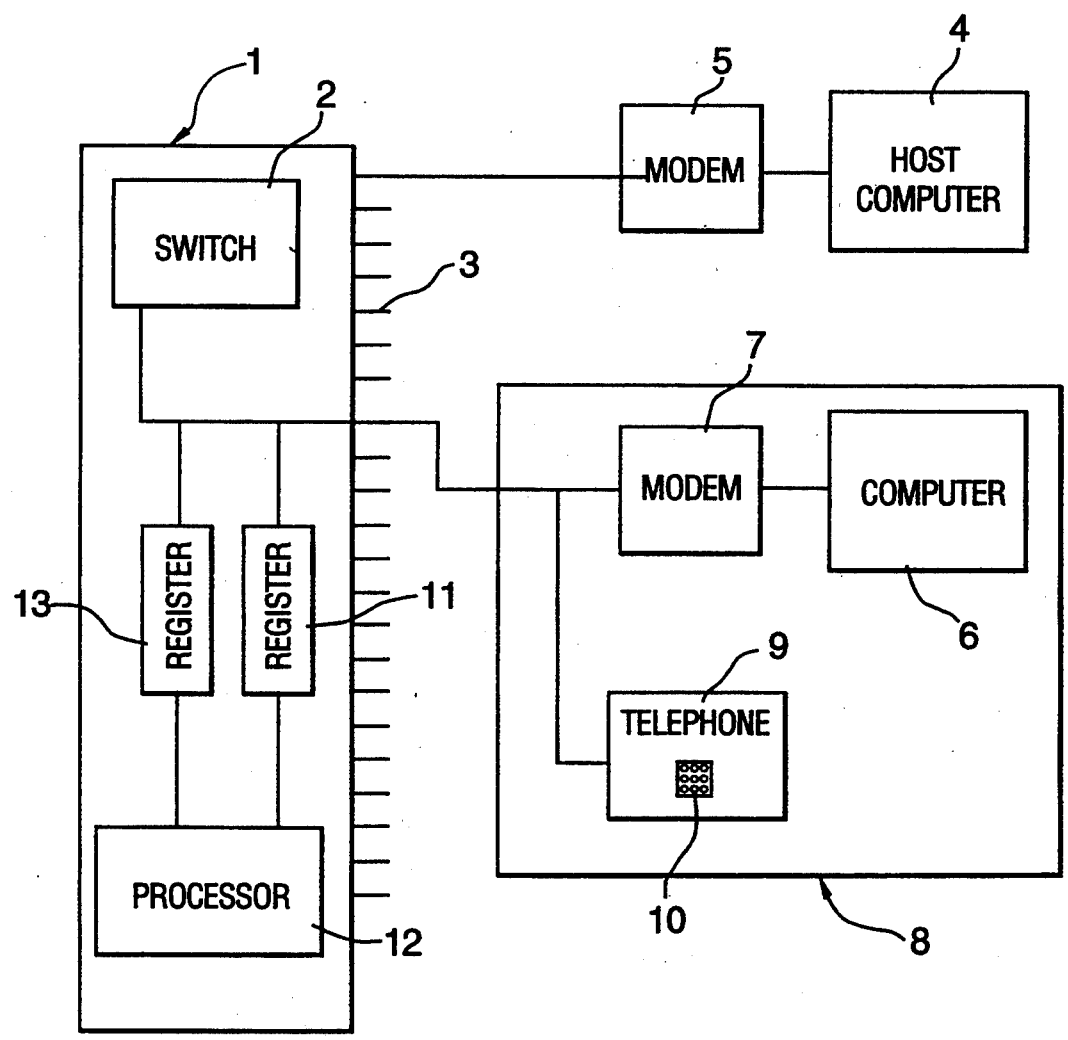

DELAYED CANCEL CALL WAITING

BACKGROUND OF THE INVENTION

This invention relates to a telecommunications system with a call waiting feature, and more particularly a telecommunications system where a plurality of subscribers are connected to a central office in such a way that a tone is transmitted over an open line to alert an active subscriber to the presence of a second incoming call.

Call waiting has been offered by most telephone companies for a number of years. If, for example, the subscriber is awaiting an urgent incoming call he or she can continue to use the telephone without fear of losing the important call. On receipt of the call waiting tone, the subscriber can terminate the existing call in progress and speak to the calling party, or alternatively place the previous call on hold and switch between the two calls.

Call waiting is a very useful feature in the voice mode, but unfortunately the transmitted tone interferes with modem connections in the data transmission mode. Most companies provide a cancellation feature which allows the subscriber to enter a predetermined (Cancel Call Waiting) CCW access code and disable the call waiting feature.

Call waiting can be disabled either at the start of a call by entering the appropriate access code or during a call by flashing and dialing the access code. The CCW feature is automatically cancelled at the termination of the call.

The CCW feature works satisfactorily when the subscriber dials up a remote computer and initiates modem transmission. However, as a security feature many host computers operate in the dial-up/dial-back mode. In this mode, the subscriber dials up the host computer to enter the computer system and his personal identification code on the telephone key pad. He then hangs up. Subsequently, the host computer dials back the subscriber and establishes the modem connection. Unfortunately, in this situation the standard CCW feature does not work because when the subscriber hangs up his phone, the CCW feature is automatically cancelled. After the subscriber's modem has answered the incoming call, it is not feasible to flash and enter the CCW code because the modem connection is immediately broken.

SUMMARY OF THE INVENTION

An object of the invention is to alleviate the aforementioned disadvantage.

Accordingly, the present invention provides a telecommunications system with a call waiting feature, comprising a central office and a plurality of subscribers, said system including means for transmitting a signal over an off-hook line to alert the subscriber to the presence of an incoming call, and a cancel call waiting (CCW) register at said central office, said CCW register being associated with each subscriber line and being set to cancel said call waiting feature in response to receipt of a cancellation code over the associated subscriber line and being reset upon termination of a subsequent call, the improvement wherein said central office further comprises a delayed cancel call waiting (DCCW) register for each subscriber line, said DCCW register being set to said first state in response to receipt of a DCCW access code transmitted over its associated subscriber line, processor means for checking and resetting the state of said DCCW register when the associated line goes off hook in response to an incoming call, and said processor means setting said CCW register in response to detection of a first state condition in said DCCW register so as to cancel said call waiting feature only for the duration of a single incoming call.

By providing an additional DCCW register, the subscriber can activate the call wait cancellation feature for the subsequent incoming call so that when the host computer dials back either the CW feature is cancelled or the CCW feature is activated. On initiation of the incoming call, the DCCW register is reset and the CCW register is reset upon termination of the call in the usual manner. Consequently, upon termination of the incoming call from the host computer, the system is restored to its normal operative condition.

The invention therefore overcomes the aforementioned problems of the prior art regarding the use of the call waiting feature in dial-up/dial-back systems.

BRIEF DESCRIPTION OF THE DRAWINGS

The invention will now be described in more detail, by way of example only, with reference to the accompanying drawings, in which:

The single FIGURE is a block diagram of a telecommunications system implementing a delayed cancel call waiting feature in accordance with the invention.

DESCRIPTION OF THE PREFERRED EMBODIMENTS

Referring now to the figure, central office 1 with switch 2 has subscriber lines 3, of which two are respectively shown connected to a dial-up host computer 4 through modem 5 and a computer 6 through modem 7 at a subscriber location 8. The subscriber also includes a telephone line with standard keypad 10. The subscriber is normally provided with DTMF dialing.

Each subscriber line 3 is associated with a standard cancel call waiting register 11 connected to a call waiting processor 12. In accordance with standard cancel call waiting implementation, the subscriber 8 can dial up the central office 1, transmit a special CCW access code to set the register 11. In response to setting of the register 11, the processor 12 cancels implementation of the call waiting feature in switch 2 until termination of the call which automatically resets the register 11.

In accordance with the invention, a second register 13 acting as a delayed cancel call waiting (DCCW) register is associated with each subscriber line 3. When the subscriber 8 transmits an access code, which can conveniently be a four digit code which is different from the normal CCW access code, the register 13 is set. The register 13 remains set after termination of the current call.

On receipt of a subsequent incoming call, the processor 12 checks the state of register 13, and if it is set, automatically sets the normal CCW register 11. The processor 12 also resets the DCCW register 13. Consequently, the CCW feature is implemented for the duration of the incoming call, but upon termination the call waiting feature is restored in the normal manner.

In either case, when the CCW register is set and the incoming caller hears the normal busy tone. Once it is reset, the incoming caller hears the ringing tone and of course the subscriber is alerted by the call waiting tone in the normal manner.

The described arrangement solves the problem outlined at the outset in that in the event of the subscriber dialing up a dial-up/dial-back host, he can first enter the DCCW access code through his telephone keypad 9. When the dial-back call from host computer 4 is answered by the subscriber's modem 7, the processor 12 sets the normal CCW register 11 and the CCW is implemented for the duration of the incoming call from the dial-back computer while modem transmission is completed. Subsequently, the system is restored to its normal CW (call waiting) condition.

I claim:

1. In a telecommunications system with a call waiting feature, comprising a central office and a plurality of subscribers, said system including means for transmitting a signal over an off-hook line to alert the subscriber to the presence of an incoming call, and a cancel call waiting (CCW) register at said central office, said CCW register being associated with each subscriber line and being set to cancel said call waiting feature in response to receipt of a cancellation code over the associated subscriber line and being reset upon termination of a subsequent call, the improvement wherein said central office further comprises a delayed cancel call waiting (DCCW) register for each subscriber line, said DCCW register being set in response to receipt of a DCCW access code transmitted over its associated subscriber line, processor means for checking and resetting the state of said DCCW register when the associated line goes off hook in response to an incoming call, and said processor means setting said CCW register in response to detection of a set condition in said DCCW register so as to cancel said call waiting feature only for the duration of a single incoming call.

2. A telecommunications system as claimed in claim 1, wherein a local computer is connected to a host computer via modem, and said host computer implements a dial-up/dial-back feature.

3. A telecommunications system as claimed in claim 1, wherein said DCCW code is entered via the telephone key-pad.

* * * * *